(12) United States Patent
Ginzton et al.

(10) Patent No.: US 9,390,286 B2
(45) Date of Patent: *Jul. 12, 2016

(54) ENFORCING RESTRICTIONS RELATED TO A VIRTUALIZED COMPUTER ENVIRONMENT

(71) Applicant: VMware, Inc., Palo Alto, CA (US)

(72) Inventors: Matthew David Ginzton, San Francisco, CA (US); Matthew B. Eccleston, San Francisco, CA (US); Srinivas Krishnamurti, Palo Alto, CA (US); Gerald C. Chen, San Francisco, CA (US); Nick Michael Ryan, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/340,506

(22) Filed: Jul. 24, 2014

(65) Prior Publication Data

US 2014/0351956 A1 Nov. 27, 2014

Related U.S. Application Data

(60) Continuation of application No. 13/853,766, filed on Mar. 29, 2013, now Pat. No. 8,812,876, which is a division of application No. 11/522,172, filed on Sep. 14, 2006, now Pat. No. 8,528,107.

(60) Provisional application No. 60/718,656, filed on Sep. 19, 2005.

(51) Int. Cl.
*G06F 12/14* (2006.01)
*G06F 11/30* (2006.01)
*G06F 9/455* (2006.01)
*G06F 21/62* (2013.01)
*H04L 29/06* (2006.01)

(52) U.S. Cl.
CPC ........ *G06F 21/6281* (2013.01); *G06F 9/45558* (2013.01); *G06F 12/1408* (2013.01); *H04L 63/0236* (2013.01); *G06F 2009/45587* (2013.01); *G06F 2221/2107* (2013.01)

(58) Field of Classification Search
CPC ..... G06F 21/60; G06F 21/62; G06F 21/6218; G06F 21/6281; G06F 2221/2107; G06F 9/455; G06F 9/45533; G06F 9/45558; G06F 2009/45587; G06F 12/14; G06F 12/1408; H04L 63/20; H04L 63/0227; H04L 63/0236
See application file for complete search history.

(56) References Cited

U.S. PATENT DOCUMENTS

| | | | |
|---|---|---|---|
| 6,253,224 B1 * | 6/2001 | Brice et al. | 718/1 |
| 6,647,422 B2 * | 11/2003 | Wesinger et al. | 709/228 |
| 7,428,636 B1 * | 9/2008 | Waldspurger et al. | 713/164 |
| 7,506,170 B2 * | 3/2009 | Finnegan | 713/182 |
| 7,757,231 B2 * | 7/2010 | Anderson et al. | 718/1 |
| 7,908,653 B2 * | 3/2011 | Brickell | G06F 21/51 709/215 |

* cited by examiner

Primary Examiner — Zachary A Davis

(57) ABSTRACT

An administrator may set restrictions related to the operation of a virtual machine (VM), and virtualization software enforces such restrictions. There may be restrictions related to the general use of the VM, such as who may use the VM, when the VM may be used, and on what physical computers the VM may be used. There may be similar restrictions related to a general ability to modify a VM, such as who may modify the VM. There may also be restrictions related to what modifications may be made to a VM, such as whether the VM may be modified to enable access to various devices or other resources. There may also be restrictions related to how the VM may be used and what may be done with the VM. Information related to the VM and any restrictions placed on the operation of the VM may be encrypted to inhibit a user from circumventing the restrictions.

20 Claims, 4 Drawing Sheets

ENFORCING RESTRICTIONS RELATED TO A VIRTUALIZED COMPUTER ENVIRONMENT

CROSS-REFERENCE TO RELATED APPLICATION(S)

This application is a Continuation application of, and claims benefit of, U.S. patent application Ser. No. 13/853,766, which was filed Mar. 29, 2013, which in turn claims benefit of, U.S. patent application Ser. No. 11/522,172, which was filed Sep. 14, 2006, which in turn claims benefit of U.S. Provisional Application No. 60/718,656, filed Sep. 19, 2005. The parent application of this Continuation is incorporated herein by reference.

BACKGROUND OF THE INVENTION

1. Field of the Invention

This invention relates to virtualized computer environments, and, in particular, to enforcing restrictions related to a virtualized computer environment.

2. Description of the Related Art

The invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

The invention generally relates to enforcing one or more restrictions related to a virtualized computer environment. The virtualized computer environment may be a virtual machine (VM), for example. It can be a fully virtualized computer, which supports an OS designed to run on whichever hardware platform is virtualized, or a so-called paravirtualized computer, where the OS is modified to communicate or interact in some way with the virtualization software. There may be a wide variety of restrictions that may be enforced in a wide variety of different ways. There may be restrictions related to the general use of a VM, such as who may use the VM, when the VM may be used, and on what physical computers the VM may be used. There may be similar restrictions related to a general ability to modify a VM, such as who may modify the VM. There may also be restrictions related to what modifications may be made to a VM, such as whether the VM may be modified to enable access to various devices or other resources, such as a LAN (Local Area Network), the Internet, a CD-ROM (Compact Disc-Read Only Memory) drive, a floppy disc drive, or a USB (Universal Serial Bus) port. There may also be restrictions related to how the VM may be used and what may be done with the VM. For example, use of the VM to access one or more TCP/IP (Transmission Control Protocol/Internet Protocol) networks may be limited by the address for which access is sought, the protocol being used, or the subject matter of data for which access is sought. A wide variety of other restrictions may also be imposed.

A wide variety of advantages may be realized by enforcing one or more such restrictions, depending on various factors, such as which restriction(s) are enforced, how the invention is implemented, and the environment in which the invention is operating. For example, the invention may be implemented in a corporate environment with a variety of restrictions to improve security on a physical computer in which the invention is implemented, and/or to improve the security of one or more networks to which such a computer is connected. Implementing the invention in a corporate environment may also simplify the task of configuring a group of physical computers for use by individual employees. The invention may also be used to restrict access to licensed computer programs or to restrict access to various types of data, such as sensitive or confidential information or digital entertainment content, such as movies, songs or video games.

One embodiment of the invention is implemented in an existing product of the assignee of this patent, VMware, Inc. This product, which is named the ACE virtualization product, is referred to as a "hosted" virtual computer system. The general architecture of a hosted virtual computer system is described below to provide background for the detailed description of the invention. Other embodiments of the invention may be implemented in a wide variety of other virtualized computer environments, though.

Hosted Virtual Computer System

FIG. 1 illustrates the main components of a "hosted" virtual computer system 100 as generally implemented in the ACE virtualization product of VMware, Inc. The virtual computer system 100 supports a VM 300. As is well known in the field of computer science, a VM is a software abstraction or a "virtualization," often of an actual physical computer system. As in conventional computer systems, both system hardware 102 and system software 150 are included. The system hardware 102 includes one or more processors (CPUs) 104, which may be a single processor, or two or more cooperating processors in a known multiprocessor arrangement. The system hardware also includes system memory 108, one or more disks 110, and some form of memory management unit (MMU) 106. The system memory is typically some form of high-speed RAM (random access memory), whereas the disk is typically a non-volatile, mass storage device. As is well understood in the field of computer engineering, the system hardware also includes, or is connected to, conventional registers, interrupt-handling circuitry, a clock, etc., which, for the sake of simplicity, are not shown in the figure.

The system software 150 typically either is or at least includes an operating system (OS) 152, which has drivers 154 as needed for controlling and communicating with various devices 112, and usually with the disk 110 as well. Conventional applications 160 (APPS), if included, may be installed to run on the hardware 102 via the system software 150 and any drivers needed to enable communication with devices.

The VM 300—also known as a "virtual computer"—is often a software implementation of a complete computer system. In the VM, the physical system components of a "real" computer are emulated in software, that is, they are virtualized. Thus, the VM 300 will typically include virtualized ("guest") system hardware 302, which in turn includes one or more virtual CPUs 304 (VCPU), virtual system memory 308 (VMEM), one or more virtual disks 310 (VDISK), and one or more virtual devices 312 (VDEVICE), all of which are implemented in software to emulate the corresponding components of an actual computer. The concept, design and operation of virtual machines are well known in the field of computer science.

The VM 300 also has system software 350, which may include a guest OS 352, as well as drivers 354 as needed, for example, to control the virtual device(s) 312. The guest OS 352 may, but need not, simply be a copy of a conventional, commodity OS. Of course, most computers are intended to run various applications, and a VM is usually no exception. Consequently, by way of example, FIG. 1 illustrates one or more applications 360 (APPS) installed to run on the guest OS 352; any number of applications, including none at all, may be loaded for running on the guest OS, limited only by the requirements of the VM. Software running in the VM 300, including the guest OS 352 and the guest applications 360, is generally referred to as "guest software."

Note that although the virtual hardware "layer" 302 is a software abstraction of physical components, the VM's system software 350 may be the same as would be loaded into a hardware computer. The modifier "guest" is used here to indicate that the VM, although it acts as a "real" computer from the perspective of a user, is actually just computer code that is executed on the underlying "host" hardware and software platform 102, 150. Thus, for example, I/O to a virtual device 312 will actually be carried out by I/O to a corresponding hardware device 112, but in a manner transparent to the VM.

Some interface is usually required between the VM 300 and the underlying "host" hardware 102, which is responsible for actually executing VM-related instructions and transferring data to and from the actual physical memory 108, the processor(s) 104, the disk(s) 110 and the other device(s) 112. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 34-45.

A VMM is usually a relatively thin layer of software that runs directly on top of host software, such as the system software 150, or directly on the hardware, and virtualizes the resources of the (or some) hardware platform. FIG. 1 shows virtualization software 200 running directly on the system hardware 102. The virtualization software 200 may be a VMM, for example. Thus, the virtualization software 200 is also referred to herein as a VMM 200. The VMM 200 will typically include at least one device emulator 202, which may also form the implementation of the virtual device 312. The VMM 200 may also include a memory manager 204 that maps memory addresses used within the VM 300 (for the virtual memory 308) to appropriate memory addresses that can be applied to the physical memory 108. The VMM also usually tracks and either forwards (to the host OS 152) or itself schedules and handles all requests by its VM for machine resources, as well as various faults and interrupts. FIG. 1 therefore illustrates an interrupt (including fault) handler 206 within the VMM. The general features of VMMs are well known and are therefore not discussed in further detail here.

FIG. 1 illustrates a single VM 300 merely for the sake of simplicity; in many installations, there will be more than one VM installed to run on the common hardware platform; all may have essentially the same general structure, although the individual components need not be identical. Also in FIG. 1, a single VMM 200 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In all of these configurations, there must be some way for the VM to access hardware devices, albeit in a manner transparent to the VM itself. One solution would of course be to include in the VMM all the required drivers and functionality normally found in the host OS 152 to accomplish I/O tasks. Two disadvantages of this solution are increased VMM complexity and duplicated effort—if a new device is added, then its driver would need to be loaded into both the host OS and the VMM. A third disadvantage is that the use of a hardware device by a VMM driver may confuse the host OS, which typically would expect that only the host's driver would access the hardware device. A different method for enabling the VM to access hardware devices has been implemented by VMware, Inc., in its ACE virtualization product. This method is also illustrated in FIG. 1.

In the system illustrated in FIG. 1, both the host OS 152 and the VMM 200 are installed at system level, meaning that they both run at the greatest privilege level and can therefore independently modify the state of the hardware processor(s). For I/O to at least some devices, however, the VMM may issue requests via the host OS. To make this possible, a special driver VMdrv 254 is installed as any other driver within the host OS 152 and exposes a standard API (Application Program Interface) to a user-level application VMapp 260. When the system is in the VMM context, meaning that the VMM is taking exceptions, handling interrupts, etc., but the VMM wishes to use the existing I/O facilities of the host OS, the VMM calls the driver VMdrv 254, which then issues calls to the application VMapp 260, which then carries out the I/O request by calling the appropriate routine in the host OS.

In FIG. 1, a vertical line 230 symbolizes the boundary between the virtualized (VM/VMM) and non-virtualized (host software) "worlds" or "contexts." The driver VMdrv 254 and application VMapp 260 thus enable communication between the worlds even though the virtualized world is essentially transparent to the host system software 150.

FIG. 2 also illustrates the computer system 100 of FIG. 1, including some of the same components that are illustrated in FIG. 1, but FIG. 2 also illustrates some additional components of a particular implementation of the generalized hosted virtual computer system 100 of FIG. 1. Thus, FIG. 2 illustrates the following components that are also illustrated in FIG. 1, each of which may be the same as described above, except as described below: the system hardware 102, the CPU(s) 104, the MMU 106, the system memory 108, the disk 110, the device(s) 112, the host OS 152, the applications 160, the virtualization software 200 (which may be a VMM), the VM 300, the virtual system hardware 302, the virtual CPUs 304, the virtual system memory 308, the virtual disk 310, the virtual device(s) 312, the guest OS 352, the guest applications 360, and the virtualized/non-virtualized boundary 230.

FIG. 2 also illustrates a VM folder 120 that is stored on the disk 110. The VM folder 120 may be a conventional folder or directory, within a file system of the host OS 152. The VM folder 120 contains a number of conventional files, according to the file system of the host OS 152, including one or more VM configuration files 122 and one or more virtual disk files 124. The VM configuration files 122 may have any of a wide variety of formats, including possibly a standard text format, such as ASCII (American Standard Code for Information Interchange). The virtual disk files 124 typically have a format that is unique to the virtualization software 200 and that enables the virtualization software 200 to present data blocks within the virtual disk files as if they constitute a complete disk drive, namely the virtual disk 310. For example, the virtual disk 310 may comprise a certain number of data blocks, just like a physical disk, and each data block of the virtual disk 310 may be mapped to a specific data block within the virtual disk files 124. Information regarding the mapping from the data blocks of the virtual disk 310 to the data blocks in the virtual disk files 124 may also be contained within the virtual disk files 124, for example.

The files in the VM folder 120 define all aspects of the VM 300, at least when the VM 300 is not running. The VM configuration files 122 define all aspects of the virtual system hardware 302, except for the virtual disk 310. Thus, the VM configuration files 122 specify various items, such as how many virtual CPUs 304 there are, how much virtual system memory 308 there is and which virtual devices 312 there are. The virtualization software 200 reads the VM configuration files 122 to determine precisely what virtual system hardware 302 is to be emulated for the VM 300.

The virtual disk files 124 contain all of the data that appears, from the perspective of the VM 300, to be stored on the virtual disk 310. Thus, when the guest OS 352 is installed within the VM 300, the data blocks of the virtual disk files 124 that constitute the virtual disk 310 are effectively formatted in the same manner that the data blocks of a complete physical disk would be formatted, and the code and data of the guest OS 352 are written to data blocks of the virtual disk files 124 that correspond to the appropriate data blocks of the virtual disk 310. Similarly, when guest applications 360 are installed onto the virtual disk 310, the code and data for the applications are written to data blocks of the virtual disk files 124 that correspond with the locations on the virtual disk 310 to which the guest OS 352 intended that the applications be installed. All other code and data, such as user files created using the guest applications 360, are also stored in the virtual disk files 124 in a similar manner.

There are actually three different perspectives that may be considered here relative to the VM folder 120, the VM configuration files 122 and the virtual disk files 124. From the perspective of the host OS 152, the VM folder 120 is an ordinary folder in its file system containing ordinary files. The VM configuration files 122 may be ordinary text files, which the host OS 152 may read, display, print, search, etc., but the contents of these files are generally of no use to the host OS. The virtual disk files 124, however, typically have a format that is not understood by the host OS 152.

From the perspective of the virtualization software 200, the contents of the VM configuration files 122 can be read and used to determine precisely what virtual system hardware 302 should be emulated for use within the VM 300. Also, the format of the virtual disk files 124 is understood by the virtualization software 200, and the data blocks of the virtual disk files 124 are used by the virtual software 200 to emulate the virtual disk 310.

From within the VM 300, there is no direct access to the VM configuration files 122 or the virtual disk files 124. The guest software within the VM 300 and a user of the VM 300 only see the virtual system hardware 302 emulated by the virtualization software 200, based on the VM configuration files 122, and the virtual disk 310 emulated by the virtualization software 200, based on the virtual disk files 124.

FIG. 2 also shows a VM configuration/control interface application 262 running on the host OS 152, in the non-virtualized context. The configuration/control interface application 262 may be combined with the application VMapp 260 of FIG. 1 in some manner, such as by creating a single application that serves both purposes. This control interface application 262 provides a user interface to allow a user to create, configure and control the VM 300 (along with any other VMs that may exist in the computer system 100), while the host OS 152 is active. Thus, before the VM 300 exists, the control interface 262 enables a user to create the VM 300. The user can then use the control interface 262 to specify various characteristics of the virtual system hardware 302 that is to be included within the VM 300, such as how much virtual system memory 308 is to be provided, how large a virtual disk 310 is to be provided, and which virtual devices 312 are to be included. When the user creates the VM 300 and specifies the virtual system hardware 302, the control interface application 262 creates the VM folder 120, along with the VM configuration files 122 and the virtual disk files 124, including all the information needed by the virtualization software 200 to emulate the virtual system hardware 302, including the virtual disk 310, as specified by the user.

The user may then use the control interface 262 to cause the VM 300 to begin executing, and the user may cause the context of the computer system 100 to switch to the virtualized context of the virtualization software 200. The user may then operate within the VM 300 to install the guest OS 352 and the guest applications 360, just like on a physical computer system. The user can then run the guest applications 360 and use the guest OS 352, just like on a physical computer system. The user can also cause the computer system 100 to switch back to the non-virtualized context of the host OS 152, such as by a particular set of key strokes on the keyboard of the computer system 100. Once the system switches back to the non-virtualized context, the user can use the applications 160 and the host OS 152, just as if the computer system 100 had no virtualized context. The user can also use the control interface application 262 to take a variety of actions relative to the VM 300 or other VMs in the computer system 100. For example, the user can use the control interface 262 to modify the virtual system hardware 302 that is provided within the VM 300, such as by adding an additional virtual device 312. The user can also use the control interface 262 to take various other actions relative to the VM 300, such as pausing the VM, suspending the VM, resuming the VM, and creating a redo log for the virtual disk 310. When the user takes such actions through the control interface 262, the control interface interacts with the virtualization software 200 to effect the actions; and/or the control interface 262 and/or the virtualization software 200 modify the VM configuration files 122 and/or the virtual disk files 124, as needed. Thus, for example, if the user adds another virtual device 312 to the VM 300, the control interface application 262 may modify the VM configuration files 122 to specify the added virtual device.

The user may also use other applications 160 and/or the host OS 152 to access the VM folder 120, the VM configuration files 122 and the virtual disk files 124 directly. For example, the user may copy the entire VM folder 120 to another physical computer, such as through a network connection, although the virtual disk files 124 may be very large, as they contain the entire contents of the virtual disk 310, including the guest OS 352 and the guest applications 360. Also, the user may use an application 160, for example, to display the contents of the VM configuration files 122, especially if the VM configuration files are simple text files. The user may be able to figure out the structure of the contents of the VM configuration files 122 and may be able to change the virtual system hardware 302, for example, by directly editing the VM configuration files 122. The vendor of the virtualization product may also provide information and/or tools that facilitate the direct manipulation of the VM configuration files 122. The user may also directly access the virtual disk files 124 for a variety of purposes, although the format of the virtual disk files 124 typically makes such access a little more challenging.

A user of the virtual computer system 100 of FIGS. 1 and 2 has great freedom to perform a wide variety of actions with and to the VM 300. The user can create the VM 300; configure the VM; modify the configuration of the VM; display, modify or copy the VM configuration files 122 and/or the virtual disk files 124; and control the operation of the VM, such as starting and stopping the VM. Depending on the capabilities provided by the virtual system hardware 302, the user may also use the VM 300 to take a variety of other actions. For example, if the virtual system hardware 302 includes a device 312 that is a floppy disk drive, which is implemented through a floppy disk drive of the physical computer, then the user may copy data between the virtual disk 310 (actually the virtual disk files 124 on the physical disk 110) and a floppy disk in the floppy disk drive. Also, if the virtual system hardware 302 includes a device 312 that is a NIC (Network Interface Card), which is implemented through a NIC of the physical computer, then the user may be able to access a LAN and/or the Internet, and download programs, copy data, send and receive emails, etc.

SUMMARY OF THE INVENTION

One embodiment of the invention comprises a method for enforcing restrictions within a virtualized computer system, wherein the restrictions relate to the operation of a virtual machine (VM). The method comprises (a) enabling administrative access to the setting of one or more restrictions related to the operation of the VM, wherein the administrative access is restricted to one or more administrative entities; (b) providing one or more users with user access to the VM; and (c) enforcing the one or more restrictions set by the one or more administrative entities, using enforcer software executing within a physical computer on which the VM runs, so that the operation of the VM during the user access by the one or more users is restricted based on the one or more restrictions.

Another embodiment of the invention relates to a computer program product embodied in a computer readable medium, with instructions for implementing this method. The invention may also be implemented in a computer system comprising one or more physical computers, wherein a VM runs on a first physical computer, with a first set of one or more computer software modules for enabling administrative access and a second set of one or more enforcer software modules for enforcing one or more restrictions, and wherein the one or more enforcer software modules execute within the first physical computer.

Other embodiments of the invention involve generating restriction information that indicates one or more restrictions set by one or more administrative entities, wherein enforcer software uses the restriction information to determine the one or more restrictions to be enforced. Other embodiments of the invention involve encrypting restriction information and/or configuration information before writing such information to a storage device and decrypting such encrypted information upon reading the information from the storage device. In still other embodiments of the invention, restriction information is stored in one or more policy files on the storage device, configuration information is stored in one or more configuration files on the storage device, and the one or more policy files and the one or more configuration files are cryptographically bound together, along with one or more virtual disk files.

Some of the restrictions that may be set and enforced include: a restriction that specifies when the VM may be used; a restriction that sets an expiration date after which the VM may no longer be used; a restriction that prevents a copy of the VM from being run; a restriction that specifies one or more physical computers to which execution of the VM is restricted; a restriction that specifies one or more users to whom an ability to modify a configuration of the VM is restricted; a restriction that restricts what changes may be made to a configuration of the VM; a restriction that prevents increasing the size of a virtual system memory within the VM; a restriction that restricts the VM from accessing a particular physical device, which would otherwise be accessible by the VM; a restriction that relates to how the VM may be used; a restriction that limits which users may use the VM; a restriction that limits which data may be accessed from within the VM; and a restriction that limits how a particular set of data may be accessed from within the VM.

In some embodiments of the invention, a first restriction may restrict the operation of the VM only when used by a first user and a second restriction may restrict the operation of the VM only when used by a second user. In other embodiments of the invention, one or more restrictions may prevent a user from transferring any code or data into or out of the VM. This may be accomplished, for example, by restricting access to any removeable or disconnectable device and by restricting network access.

DETAILED DESCRIPTION

The invention relates to enforcing one or more restrictions related to a computing environment that is at least partially virtualized. The invention may be implemented in a wide variety of physical computer systems, having a wide variety of hardware platforms and configurations, and a wide variety of software platforms and configurations. The invention may also be implemented in computer systems having varying degrees and/or types of virtualization, including fully virtualized computer systems, so-called paravirtualized computer systems, and a wide variety of other types of virtual computer systems, including virtual computer systems in which a virtualized hardware platform is either substantially the same as or substantially different from the underlying physical hardware platform. The invention may also be implemented to enforce a wide variety of different types of restrictions related to the computing environment.

One particular embodiment of the invention is described below merely to provide an example of how the invention can be implemented. A person of skill in the art will understand, based on the teachings of this exemplary implementation, how to implement the invention to enforce a wide variety of other restrictions, in a wide variety of virtual computer systems, having a wide variety of hardware and software platforms and configurations, and having a wide variety of types and degrees of virtualization.

Figure 1:
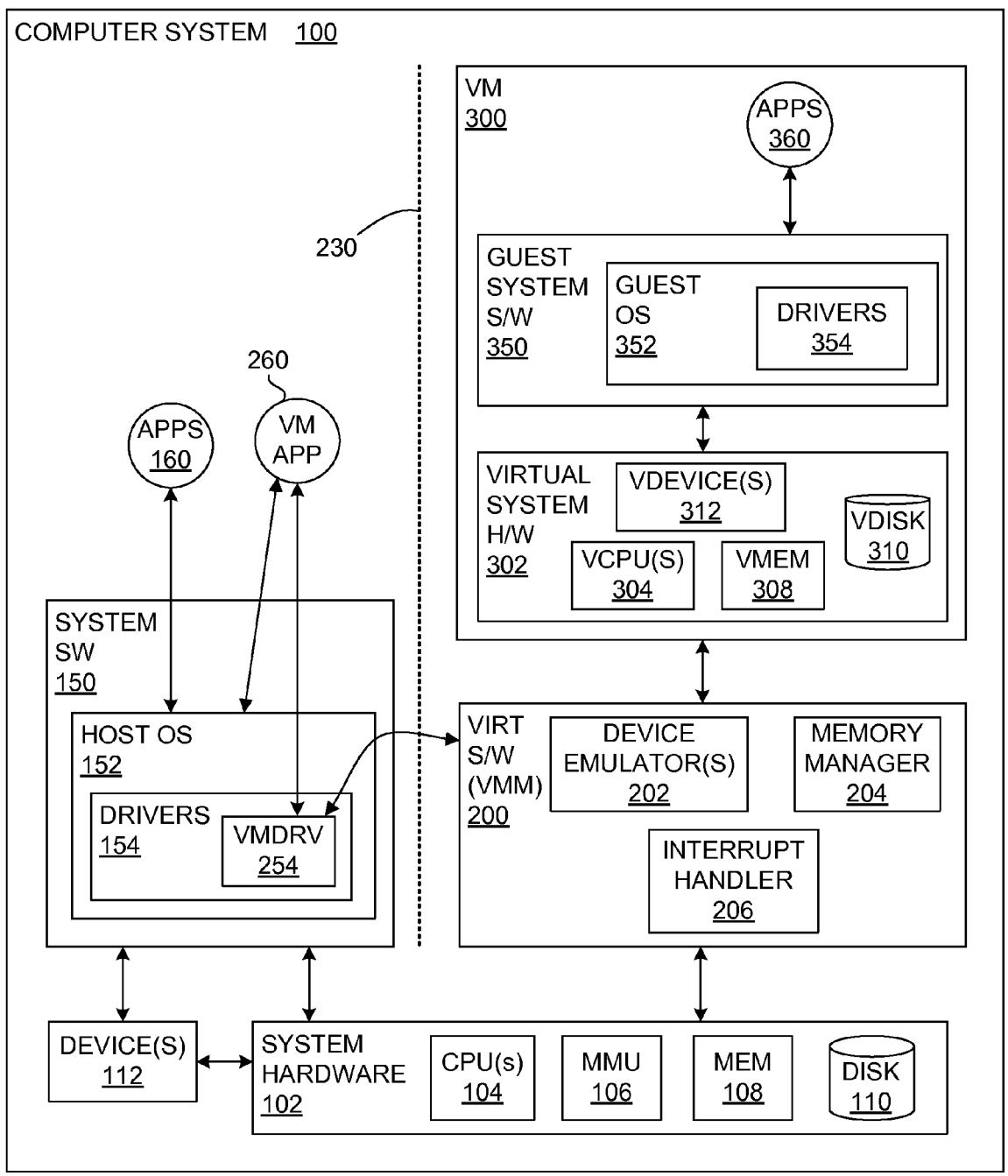
FIG. 1 illustrates the main components of a generalized hosted virtual computer system.
Figure 2:
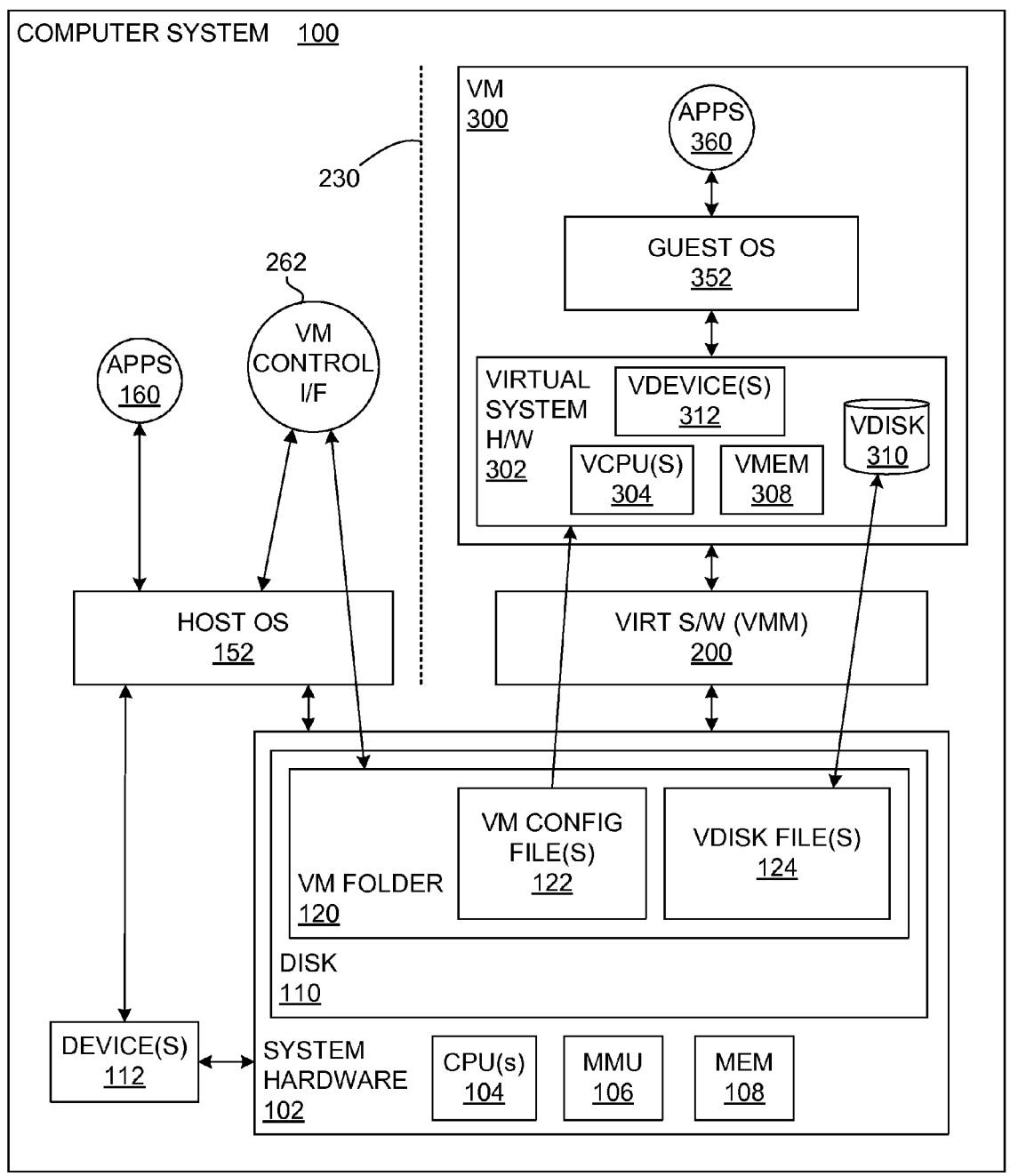
FIG. 2 illustrates additional aspects of one particular implementation of the generalized hosted virtual computer system of FIG. 1.
Figure 3:
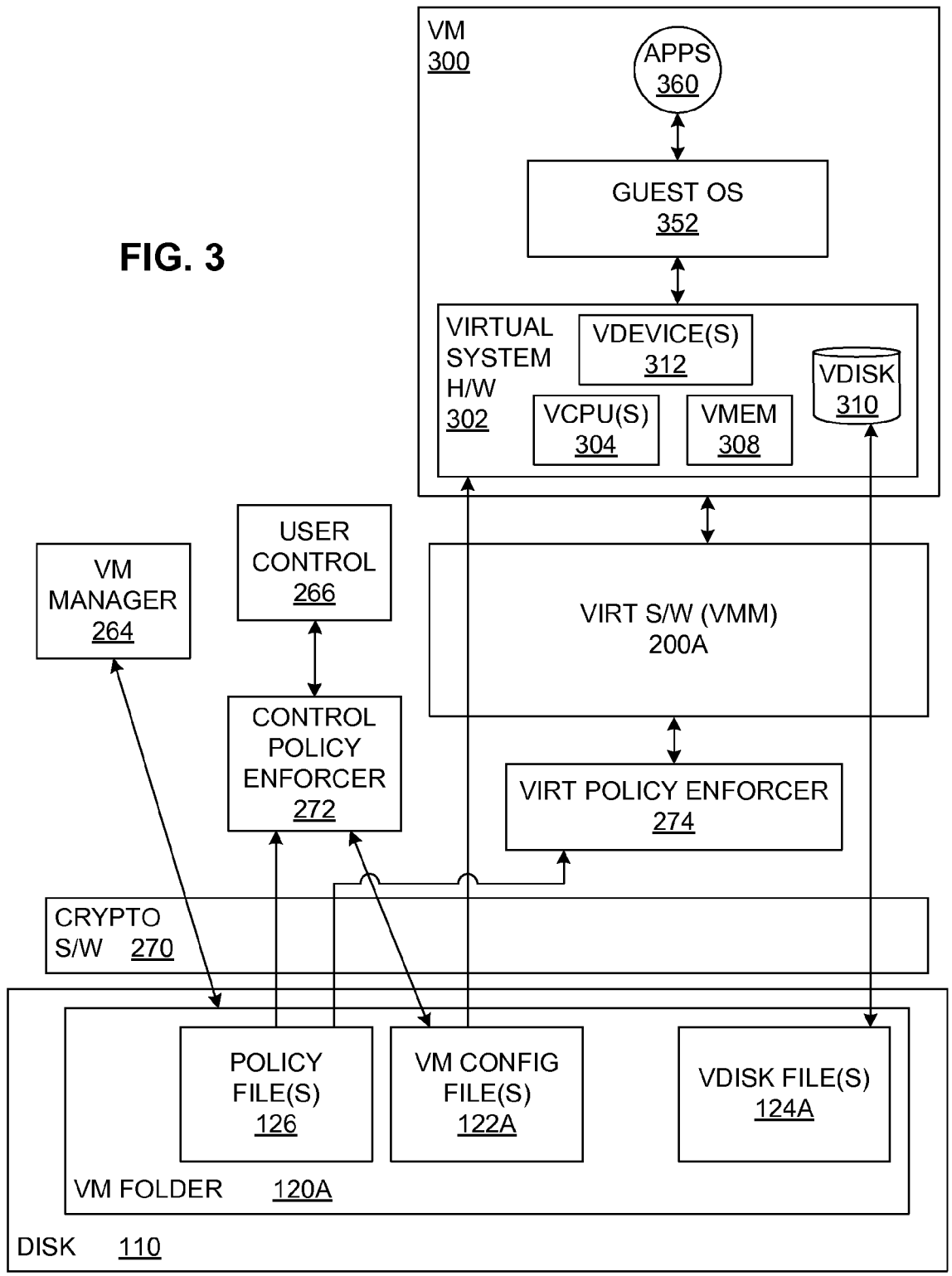
FIG. 3 illustrates one implementation of the invention, based on the hosted virtual computer system of FIGS. 1 and 2.

Thus, FIG. 3 illustrates one embodiment of the invention, wherein the hosted virtual computer system 100 of FIGS. 1 and 2 is modified to implement this one embodiment of the invention. FIG. 3 illustrates some of the same components as are illustrated in FIGS. 1 and/or 2, but many of the components illustrated in FIGS. 1 and 2 are not illustrated in FIG. 3, for simplicity. Except as described herein, components that are illustrated in FIGS. 1 and 2, but that are not illustrated in FIG. 3, may nonetheless be assumed to also be present in the modified virtual computer system of FIG. 3. As shown in FIG. 3, the modified computer system comprises the same VM 300, with the same virtual system hardware 302, including the same virtual CPUs 304, the same virtual system memory 308, the same virtual disk 310, the same virtual devices 312, the same guest OS 352 and the same guest applications 360, as are illustrated in FIGS. 1 and 2, and described above.

FIG. 3 also illustrates the disk 110, which may be the same as described above, except as described herein. In particular, the disk 110 includes a VM folder 120A, instead of the VM folder 120 of FIG. 2. The VM folder 120A contains one or more VM configuration files 122A, which may have the same content as the VM configuration files 122 of the VM folder 120; and the VM folder 120A contains one or more virtual disk files 124A, which may have the same content as the virtual disk files 124 of the VM folder 120. The VM configuration files 122A and the virtual disk files 124A may also be ordinary files, according to the file system used by the host OS 152. The VM folder 120A also contains one or more policy files 126, which may also be ordinary files according to the file system used by the host OS 152. FIG. 3 also illustrates virtualization software 200A, which may be the same as the virtualization software 200 of FIGS. 1 and 2, except as needed to implement the invention.

FIG. 3 also illustrates a VM manager 264. The VM manager 264 performs some of the same functions as the VM configuration/control interface application 262 of FIG. 2, but the VM manager 264 is also substantially different from the control interface application 262. The VM manager 264 enables a VM administrator to create and configure the VM 300 (as well as other VMs) in much the same manner that the control interface application 262 enables a user of the computer system of FIG. 2 to create and configure the VM 300. Thus, the VM administrator can create the VM 300 and specify the virtual system hardware 302 that is to be emulated in the VM 300, including parameters such as the amount of virtual system memory 308, the size of the virtual disk 310 and the number and types of virtual devices 312. In response to the VM administrator's creation and configuration of the VM 300, the VM manager 264 creates the VM folder 120A, along with the VM configuration files 122A and the virtual disk files 124A in much the same manner that the control interface application 262 creates the VM folder 120, along with the VM configuration files 122 and the virtual disk files 124 of FIG. 2, except that the VM configuration files 122A and the virtual disk files 124A are encrypted by a cryptographic software module 270 before they are written to the disk 110. The cryptographic software 270 may use any known or subsequently developed method for encrypting and decrypting data. FIG. 3 shows a line between the VM manager 264 and the VM folder 120A to indicate that the VM manager 264 creates and subsequently accesses the VM folder 120A, along with its contents. This line passes through the cryptographic software 270 to indicate that the cryptographic software encrypts data going from the VM manager 264 to the VM folder 120A and decrypts data coming from the VM folder to the VM manager. All of the files in the VM folder 120A are also preferably cryptographically bound together in a known manner. This ensures that people cannot take different encrypted files from different VM folders and try to combine them to form a new VM. Otherwise, someone might try, for example, to take the virtual disk files from a first VM and the VM configuration files from a second VM and combine them to create a third VM with the virtual disk of the first VM, but the VM configuration files of the second VM.

The VM manager 264 also enables the VM administrator to specify one or more restrictions related to the VM 300, such as restrictions regarding the configuration, control and use of the VM 300. There may be a wide variety of types of restrictions that the VM administrator may specify. For example, the VM administrator may specify what changes, if any, may be made to the configuration of the VM 300. Thus, the VM administrator may specify that a user may not alter the configuration of the VM 300 at all, that the user may not increase the size of the virtual system memory 308, or that the user may not add more virtual devices 312, for example. The VM administrator may also specify which user(s) are allowed to use the VM 300, identifying the user(s) in any of a variety of ways, such as by an ordinary user name, for example. Also, for each authorized user of the VM 300, the VM administrator may specify a different set of one or more restrictions that apply only to that particular user, such as restrictions regarding how the configuration of the VM may be changed or how the VM may be used. The VM administrator may also set limits on when the VM 300 may be used. For example, the VM administrator may specify that the life of the VM 300 expires on a certain date, or within a certain number of days, and a user will not be able to use the VM after the expiration date. The VM administrator may also specify the physical computer(s) on which the VM 300 may be run, or the VM administrator may specify that any copy of the VM may not be run. The VM administrator may also specify restrictions on what user(s) may do with the VM 300. For example, the VM administrator may specify that a user may not use the Internet, or the VM administrator may place restrictions on a user's TCP/IP access by restricting the addresses that may be accessed or the protocol that may be used. Any subset of these possible restrictions may be available to the VM administrator, along with a wide variety of other possible restrictions.

Information related to the restrictions specified by the VM administrator is written to the policy files 126 by the VM manager 264. Again the data is encrypted by the cryptographic software 270 before it is written to the physical disk 110.

The VM administrator may also use the VM manager 264 to begin execution of the VM 300. The VM administrator may then install the guest OS 352 and bring it up to a desired patch level. The VM administrator may also install one or more guest applications 360, and/or one or more data files that may be used by a user. If the VM administrator installs this software and/or data files, then he/she can ensure that (a) the software and/or data that users will use is up to date and, hopefully, free of bugs and exploitable security problems, (b) the software doesn't conflict with or cause problems with other necessary software, and (c) all users that use the VM 300 will have a common base of software and data, which makes maintaining multiple computers easier and more efficient. The VM folder 120A may now be fully loaded with everything that is needed to enable a user to control and use the VM 300, and possibly to modify the VM's configuration, but only in ways that do not violate the restrictions established by the VM administrator. More specifically, the VM configuration files 122A contain all of the configuration information for the VM 300, which specifies the virtual system hardware 302 that is to be emulated; the virtual disk files 124A may already be loaded with the guest OS 352, the guest applications 360, and possibly one or more user data files; and the policy files 126 contain information regarding the restrictions that have been established by the VM administrator. All of the files in the VM folder 120A have been encrypted by the cryptographic software 270 too, so that they cannot be accessed without being decrypted. The VM administrator may now provide the VM folder 120A to a user, which allows the user to control and use the VM 300A, and possibly modify the configuration of the VM, but only as permitted by the restrictions specified by the VM administrator.

FIG. 3 also illustrates a user configuration/control interface application 266. The control interface 266 also performs some of the functions of the VM configuration/control interface application 262 of FIG. 2. The control interface 266 typically does not enable a user to create and configure a new VM, but it may allow the user to modify the configuration of existing VMs, such as the VM 300, and to control their operation, such as by causing them to begin execution, to pause, to suspend and to resume. The control interface 266 may also enable a user to take other actions relative to the VM 300 (and possibly other VMs in the computer system), such as creating a redo log for the virtual disk 310.

FIG. 3 also illustrates a configuration/control policy enforcer 272. The control policy enforcer 272 works with the user configuration/control interface 266 to enable the user to modify the configuration of existing VMs and to control their operation, but only within the restrictions specified by the VM administrator. The control policy enforcer 272 and the control interface 266 may be combined in some manner, such as by creating a single software application that performs the functions of both of these functional units.

The control policy enforcer 272 reads the policy files 126 to determine the restrictions (or policies) specified by the VM administrator. The cryptographic software 270 decrypts the data from the policy files 126 before delivering the deciphered data to the control policy enforcer 272. The control policy enforcer 272 then works with the control interface 266 to restrict the actions that may be taken by a user according to the policies specified by the VM administrator.

If the VM administrator restricted which users could configure, control or use the VM 300, and if a user attempted to access the VM 300 in one of these ways, the control policy enforcer 272 would only allow the attempted access if the user could be confirmed as an authorized user. For example, the control policy enforcer 272 may require that the user enter a user name and password that matches a user name and password for which the VM administrator has authorized such access. As another example, the control policy enforcer 272 may confirm the identity of the user using other techniques, such as a biometric scanner, such as a fingerprint scanner or a retinal scanner.

If there is any restriction on when the VM 300 may be used, such as an expiration date, then the control policy enforcer 272 checks the current date and/or time against the time restriction, and only allows the access if the restriction is satisfied. The control policy enforcer 272 may also confirm that the VM 300 is authorized to run on the physical computer in which the control policy enforcer 272 is executing. In this case, the control policy enforcer 272 may compare information from the policy files 126 about authorized physical computers against corresponding information that the control policy enforcer 272 obtains directly from the physical computer on which the control policy enforcer is executing.

Once the control policy enforcer 272 has determined that a user is generally authorized to configure, control or use the VM 300, then the control policy enforcer moves on to determine whether particular actions are permitted by the user. Restrictions related to what actions a user may take may be specific to a given user or they may be more general, so that they apply to a plurality or all of the authorized users. The enforcement of some restrictions may affect how the control interface 266 interacts with a user. For example, if an authorized user is not authorized to add virtual devices 312 to the VM 300, then the control interface 266 may simply not provide such an option to the user. A similar approach may be taken with various other restrictions related to modifying the configuration of the VM 300. Similarly, the control policy enforcer 272 checks to determine what actions a user is permitted to take related to controlling the VM 300, such as whether the user is permitted to start the execution of the VM, suspend the VM, resume the VM, etc. Again, if the user is not permitted to take one or more of these control actions, the option to take a restricted action may simply not be presented to the user by the control interface 266.

The control policy enforcer 272 (or the control interface 266) may read the VM configuration files 122A, with the data being decrypted by the cryptographic software 270, to determine the current configuration of the virtual system hardware 302. The control interface 266 may then display information regarding the current configuration to a user. If the user takes an action to modify the configuration, and if the attempted modification does not violate any of the restrictions in the policy files 126, then the control policy enforcer 272 modifies (or permits the control interface 266 to modify) the VM configuration files 122A to reflect the configuration changes, again using the encryption of the cryptographic software 270. Also, if the user takes an action related to the control of the VM 300 that does not violate any of the restrictions in the policy files 126, then the control policy enforcer 272 communicates (or permits the control interface 266 to communicate) the control action to the virtualization software 200A.

FIG. 3 also illustrates a virtualization policy enforcer 274. When the VM 300 is executing, the virtualization policy enforcer 274 enforces restrictions related to how the VM 300 may be used. The virtualization policy enforcer 274 may also be combined with the control policy enforcer 272 and/or the control interface 266 in some manner, such as within a single application. Thus, the virtualization policy enforcer 274 also reads the contents of the policy files 126, after they are decrypted by the cryptographic software 270. Depending on the particular restrictions that must be enforced, the virtualization policy enforcer 274 prepares to intercept any actions related to the operation of the VM 300 that may violate a restriction. The virtualization policy enforcer 274 can typically intercept any such actions by coordinating with the virtualization software 200A. There are various known techniques for intercepting such actions during the emulation of the virtual system hardware 302.

As one example of intercepting and enforcing a restriction on such an action, suppose that access to one or more TCP/IP networks has been restricted by the IP addresses that may be accessed. The virtualization policy enforcer 274 may prepare to intercept and/or scan any outgoing TCP/IP packets to determine whether they are addressed to an IP address that would violate the restriction. The outgoing packets from the VM 300 are sent to a virtual NIC in the virtual system hardware 302. But the virtual NIC is a software construct that is controlled by the virtualization software 200A, and so the virtualization software 200A (or the virtualization policy enforcer 274) can monitor any outgoing packets to determine if they are addressed to a prohibited address. For outgoing packets that do not violate the restriction, the packets are passed on to a physical NIC and transmitted on a TCP/IP network toward the specified destination. In the case of a packet that violates the restriction, the outgoing packet is not passed on to the physical NIC for transmission onto the TCP/IP network. The processing of TCP/IP packets in a virtual computer system is also described in a U.S. patent application Ser. No. 11/231,127 ("System and Methods for Implementing Network Traffic Management for Virtual and Physical Machines"), filed on Sep. 19, 2005, issued as U.S. Pat. No. 8,166,474 B1, which is incorporated here by reference.

The cryptographic software 270 also encrypts and decrypts data for the benefit of the virtualization software 200A. Thus, when the virtualization software 200A needs to access the VM configuration files 122A to determine what virtual system hardware 302 is to be emulated, the cryptographic software 270 decrypts the data in the VM configuration files. Also, when the VM 300 is running, and data is written to or read from the virtual disk 310 (actually the disk 110, or, more specifically, the virtual disk files 124A), the cryptographic software 270 encrypts or decrypts the data, as required. Thus, the encryption of the files in the VM folder 120A is preferably transparent to the software in the VM 300 and to a user of the VM. The transfer of data to and from a virtual disk is described in U.S. patent application Ser. No. 09/844,581 ("Undefeatable Transformation for Virtual Machine I/O Operations"), filed on Apr. 26, 2001, issued as U.S. Pat. No. 7,260,820 B1, which is incorporated here by reference.

All of the restrictions or policies that have been described above have been specified by a VM administrator. However, different embodiments of the invention may also include one or more restrictions that are enforced without any need for the VM administrator to specify the restrictions. For example, in some embodiments, a restriction may be placed on a user's ability to run a VM based on an unauthorized copy of the files that define the VM, without the VM administrator having to specify such a restriction. In such a case, an authorized copy of a VM folder, such as the VM folder 120A, is installed onto a physical computer as opposed to simply being copied to the physical computer. During installation, information specific to the particular physical computer and information about the path name of the VM folder are encoded someplace, such as in the VM configuration files 122A. Then, when a user attempts to run a VM, the control policy enforcer 272 determines the same physical computer information for the computer on which the control policy enforcer 272 is running, along with the path name information for the VM that the user is attempting to run. If the newly obtained information does not match the information encoded in the corresponding VM configuration files 122A, then the control policy enforcer 272 does not allow the VM to run. The installation of the VM folder may be a part of an installation of a software package that includes all of the components of FIG. 3, except for the VM manager 264.

Referring again to FIG. 3, as described above, a VM administrator uses the VM manager 264 to create and configure the VM 300, and to specify various restrictions related to the VM 300. A user, on the other hand, uses the user configuration/control interface application 266. As described above, the actions that may be taken by a user through the control interface 266 may be limited in a variety of ways by the restrictions specified by the VM administrator. However, if the user were able to gain access to the VM manager 264, the user could remove all of the restrictions specified by the VM administrator and give himself complete freedom relative to the VM 300. In such a case, the ability of the VM administrator to specify restrictions would be rendered meaningless. Thus, one or more precautions are generally taken to ensure that a user does not gain access to the VM manager 264. As one example, a user may be provided with a computer loaded with every component illustrated in FIG. 3, except for the VM manager 264. A VM administrator may maintain a separate computer on which he/she runs the VM manager 264. After the VM administrator creates the VM folder 120A, the VM folder may be transferred to the computer of the user. Then, so long as the user does not gain access to the computer of the VM administrator, the user's actions relative to the VM 300 will be restricted as specified by the VM administrator, and the user will be unable to remove the restrictions. As another option, the VM administrator and the user may share a computer, and all of the components of FIG. 3 may be loaded onto that computer. However, access to the VM manager 264 may be password protected, and the VM administrator may ensure that the user does not get the required password.

In some embodiments of the invention, in addition to being able to create the VM 300, configure the VM, and specify restrictions on actions related to the VM, all before the VM folder 120A is distributed to one or more users, a VM administrator may also be able to use the VM manager 264 after the VM folder has been distributed to one or more users to modify the restrictions on actions related to the VM 300. In this case, when the VM administrator modifies the restrictions, a set of modified policy files 126 are generated by the VM manager 264. The modified policy files 126 may then be distributed to one or more of the same users that received the original VM folder 120A, and the original policy files are replaced by the modified policy files within the VM folder 120A of each such user. Now, when such a user tries to modify the configuration of the VM 300, control the VM or use the VM, the user's actions are limited by the new restrictions, instead of the original restrictions.

In one embodiment of the invention, when a VM administrator uses the VM manager 264 to create a new VM folder 120A, complete with VM configuration files 122A, virtual disk files 124A and policy files 126, the cryptographic software 270 generates a new set of one or more cryptographic keys, such as a matched set of one encryption key and one corresponding decryption key. The cryptographic software 270 then encrypts the VM configuration files 122A, the virtual disk files 124A and the policy files 126 with the new encryption key. A user installation package is then created that includes every component in FIG. 3, except for the VM manager 264. The cryptographic software 270 within the installation package includes the new decryption key that can be used to decrypt the VM configuration files 122A, the virtual disk files 124A and the policy files 126. The installation package can then be used to install all of the components of FIG. 3, except for the VM manager 264, onto a user's computer in a conventional manner. Once installed, the cryptographic software 270 can use the decryption key to decrypt the VM configuration files 122A, the virtual disk files 124A and the policy files 126, and all the components on the user's computer can operate as described above. The decryption key can be hidden from the user by embedding it someplace within the installed software code, or within hardware, such as in a Trusted Platform Module (TPM) or according to a Public Key Infrastructure (PKI), for example. Also, if desired, once the installation package is installed on the user's computer, the cryptographic software 270 may switch to using a different set of one or more cryptographic keys on one or more of the files within the VM folder 120A.

In one particular implementation of the invention, the VM 300 is configured and restrictions are specified such that users do not have any network access, and they are not permitted to use removable or disconnectable devices, such as CD-ROMs, floppy disks, USB devices, and serial and parallel ports. Thus, the VM 300 is configured and restricted so that users have no way to transfer any code or data into or out of the VM 300. The VM administrator now has complete control over the code and data within the VM 300. This implementation provides improved security for the VM 300, and, so long as the user is running the VM 300, the implementation provides improved security for the physical computer on which the VM 300 is running and for any network(s) to which the physical computer is connected.

The implementation of the invention described above provides a virtualized computing environment for use by a user. The virtualized computing environment may be implemented within a physical computer to which the user may generally have unrestricted access. However, the actions that may be taken by the user relative to the virtualized computing environment are nonetheless restricted, as specified by an administrator. The encryption of the data that defines the virtualized computing environment preferably ensures that the user has no direct access to view or modify the virtualized computing environment. For example, the user may not simply use a text editor to view and modify the data that specifies the configuration of the virtualized computing environment. Instead, to take any action relative to the virtualized computing environment, the user preferably must use the vendor's software that is provided for this purpose, and which enforces the restrictions specified by the administrator, or the user must use software that has access to necessary cryptographic key(s). Thus, a restricted virtualized computing environment is effectively implemented within an otherwise unrestricted physical computer.

Many security issues that are relevant to virtual computer systems have already been resolved in physical computer systems, but the resolutions in physical computer systems may not apply to virtual computer systems. For example, while a physical computer system may be prevented from being copied or duplicated by the use of computer case locks, appropriate BIOS (Basic Input/Output System), an OS configuration and/or appropriate security settings, such measures wouldn't prevent the copying of a VM. Similarly, measures used in physical computer systems to resolve security issues related to adding or removing peripheral devices and using alternate boot devices do not work in virtual computer systems. Therefore, different or additional measures may be required for virtual computer systems, such as those described herein.

Figure 4:
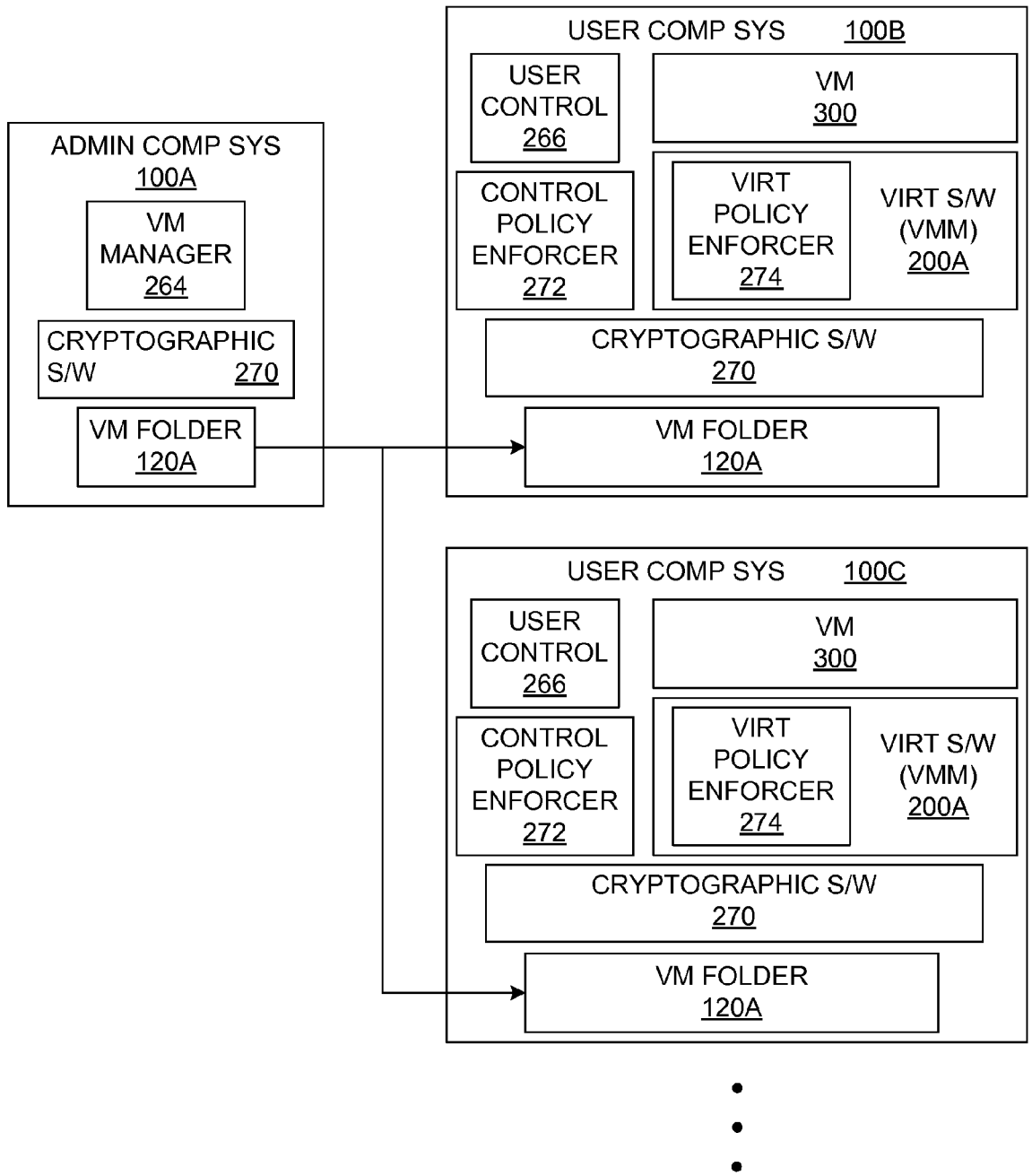
FIG. 4 illustrates a method for creating restricted virtual machines and installing them into a plurality of physical computers.

FIG. 4 illustrates a method that may be used for distributing VMs to users, so that the users may control the VMs, use the VMs, and possibly modify the configuration of the VMs, but the actions of the users relative to the VMs are limited by one or more restrictions that are specified by a VM administrator.

FIG. 4 illustrates a first virtual computer system 100A that is used by a VM administrator, along with a plurality of other virtual computer systems that are used by users, including a second virtual computer system 100B and a third virtual computer system 100C. Each of the virtual computer systems 100A, 100B and 100C may be substantially the same as the virtual computer systems described above, except as described below. In particular, the virtual computer system 100A may have all of the same components as are illustrated in FIG. 3, and the virtual computer systems 100B and 100C may have all of the same components as are illustrated in FIG. 3, except for the VM manager 264. Many of the components of the virtual computer systems 100A, 100B and 100C are not illustrated in FIG. 4 for simplicity.

The first virtual computer system 100A includes the VM manager 264, which enables the VM administrator to create and configure the VM 300, along with specifying one or more restrictions. The VM manager 264 also generates the VM folder 120A, including the VM configuration files 122A, the virtual disk files 124A and the policy files 126. The VM administrator may also install a guest OS 352, one or more guest applications 360 and one or more user data files into the VM 300, which would, in effect, be installed into the virtual disk files 124A. The files in the VM folder 120A are encrypted by the cryptographic software 270. The virtual computer system 100A may also have other components illustrated in FIG. 3, including the virtualization software 200A and the VM 300, although they are not illustrated in FIG. 4, for simplicity.

Each of the user virtual computer systems, such as the virtual computer system 100B and 100C include all of the components of FIG. 3, except for the VM manager 264, and each of these components function as described above. In particular, as illustrated in FIG. 4, the virtual computer systems 100B and 100C include the user configuration/control interface application 266, the configuration/control policy enforcer 272, the cryptographic software 270, the VM folder 120A, the virtualization policy enforcer 274, the virtualization software 200A and the VM 300.

The VM manager 264 in the VM administrator's virtual computer system 100A generates the VM folder 120A, with its contents being encrypted by the cryptographic software 270. The VM folder 120A is then distributed to each of the virtual computer systems 100B and 100C. The other components of the virtual computer systems 100B and 100C may be installed separately from the VM folder 120A. As another alternative, the VM manager 264 in the VM administrator's virtual computer system 100A may generate a complete installation package for the users' virtual computer systems 100B and 100C, including all of the components of FIG. 3, except for the VM manager 264. In this case, the users need only install the one package and they have everything they need to gain restricted access to the VM 300.

In either case, the VM folder 120A is generated by a VM administrator on the administrator's virtual computer system 100A, and it is distributed to each of the users' virtual computer systems 100B and 100C. The users of the virtual computer systems 100B and 100C can now control and use the VM 300, and may be able to modify the configuration of the VM 300, but within the restrictions specified by the VM administrator. The VM 300 may already be fully loaded with all of the software and data needed by the users of the virtual computer systems 100B and 100C. Thus, the method of FIG. 4 is a relatively simple method for providing a consistent computing environment for multiple users within an organization, where the actions that may be taken within or to the computing environment may be restricted, as desired, by the VM administrator.

What is claimed is:

1. A method for enforcing restrictions on a virtual machine (VM), said method comprising:
   executing the VM on a physical computer, the VM configured to give a user access to guest software on the VM, the VM being executed using virtualization software and a virtual disk for storing data accessible to the guest software;
   determining when an action violates one or more restrictions, the action relating to operation of the VM, the one or more restrictions being defined by contents of a policy file;
   enforcing the one or more restrictions using enforcer software that is executing on the physical computer on which the VM runs, but is not executing within any VM on the physical computer, by intercepting the action relating to operation of the VM that violates the one or more restrictions and restricting the action relating to the operation of the VM that violates the one or more restrictions.

2. The method of claim 1, wherein the VM is configured based on a configuration file containing configuration information defining virtual system hardware to emulate for the VM.

3. The method of claim 2, wherein the VM is configured to enable the user to modify configuration settings for the VM, the modifying of the configuration settings including modifying contents of the configuration file; and
   wherein at least one of the one or more restrictions is a restriction on the modifying of the configuration file.

4. The method of claim 2, further comprising:
   encrypting data written to the configuration file such that the user does not have direct access to the configuration file.

5. The method of claim 1, wherein at least one of the one or more restrictions is a network restriction that limits access to predefined IP addresses on a TCP/IP network, the network restriction being enforced by intercepting and scanning outgoing TCP/IP packets to determine whether the TCP/IP packets violate the network restriction by being addressed to the predefined IP addresses;
   wherein TCP/IP packets that do not violate the network restriction are allowed to be passed on to a physical network interface card (NIC) to be transmitted; and
   wherein the TCP/IP packets that violate the network restriction are not allowed to be passed on to the physical NIC.

6. The method of claim 1, wherein at least one of the one or more restrictions is an expiration date restriction that sets an expiration date beyond which the VM is prevented from being run; and
   wherein the VM is prevented from being executed when a current date is past the expiration date.

7. The method of claim 1, wherein at least one of the one or more restrictions is a machine restriction that permits the VM to execute only on one or more specified physical computer systems; and
   wherein the VM is prevented from being executed if the physical computer is not one of the specified physical computer systems.

8. A computing system, comprising:
   at least one physical processor; and
   memory including instructions that, when executed by the at least one processor, cause the computing system to:
   execute a virtual machine (VM) on a physical computer, which physical computer is part of the computing system, the VM configured to give a user access to guest software on the VM, the VM being executed using virtualization software and a virtual disk for storing data accessible to the guest software;
   determine when an action violates one or more restrictions, the action relating to operation of the VM, the one or more restrictions being defined by contents of a policy file;
   enforce the one or more restrictions using enforcer software that is executing on the physical computer on which the VM runs, but is not executing within any VM on the physical computer, by intercepting the action relating to operation of the VM that violates the one or more restrictions and restricting the action relating to the operation of the VM that violates the one or more restrictions.

9. The computing system of claim 8, wherein the VM is configured based on a configuration file containing configuration information defining virtual system hardware to emulate for the VM.

10. The computing system of claim 9, wherein the VM is configured to enable the user to modify configuration settings for the VM, the modifying of the configuration settings including modifying contents of the configuration file; and
    wherein at least one of the one or more restrictions is a restriction on the modifying of the configuration file.

11. The computing system of claim 9, wherein the memory further includes instructions that when executed by the at least one processor, cause the computing device to:
    encrypt data written to the configuration file such that the user does not have direct access to the configuration file.

12. The computing system of claim 8, wherein at least one of the one or more restrictions is a network restriction that limits access to predefined IP addresses on a TCP/IP network, the network restriction being enforced by intercepting and scanning outgoing TCP/IP packets to determine whether the TCP/IP packets violate the network restriction by being addressed to the predefined IP addresses;
    wherein TCP/IP packets that do not violate the network restriction are allowed to be passed on to a physical network interface card (NIC) to be transmitted; and
    wherein the TCP/IP packets that violate the network restriction are not allowed to be passed on to the physical NIC.

13. The computing system of claim 8, wherein at least one of the one or more restrictions is an expiration date restriction that sets an expiration date beyond which the VM is prevented from being run; and
    wherein the VM is prevented from being executed when a current date is past the expiration date.

14. The computing system of claim 8, wherein at least one of the one or more restrictions is a machine restriction that permits the VM to execute only on one or more specified physical computer systems; and
    wherein the VM is prevented from being executed if the physical computer is not one of the specified physical computer systems.

15. A non-transitory computer readable storage medium comprising one or more sequences of instructions, the instructions when executed by one or more processors of one or more physical computers causing the one or more processors to execute the operations of:
    executing a virtual machine (VM) on a first physical computer of the one or more physical computers, the VM configured to give a user access to guest software on the VM, the VM being executed using virtualization software and a virtual disk for storing data accessible to the guest software;

determining when an action violates one or more restrictions, the action relating to operation of the VM, the one or more restrictions being defined by contents of a policy file;

enforcing the one or more restrictions using enforcer software that is executing on the first physical computer, but is not executing within any VM on the first physical computer, by intercepting the action relating to operation of the VM that violates the one or more restrictions and restricting the action relating to the operation of the VM that violates the one or more restrictions.

16. The non-transitory computer readable storage medium of claim 15, wherein the VM is configured based on a configuration file containing configuration information defining virtual system hardware to emulate for the VM.

17. The non-transitory computer readable storage medium of claim 16, wherein the VM is configured to enable the user to modify configuration settings for the VM, the modifying of the configuration settings including modifying contents of the configuration file; and wherein at least one of the one or more restrictions is a restriction on the modifying of the configuration file.

18. The non-transitory computer readable storage medium of claim 15, wherein at least one of the one or more restrictions is a network restriction that limits access to predefined IP addresses on a TCP/IP network, the network restriction being enforced by intercepting and scanning outgoing TCP/IP packets to determine whether the TCP/IP packets violate the network restriction by being addressed to the predefined IP addresses;

wherein TCP/IP packets that do not violate the network restriction are allowed to be passed on to a physical network interface card (NIC) to be transmitted; and wherein the TCP/IP packets that violate the network restriction are not allowed to be passed on to the physical NIC.

19. The non-transitory computer readable storage medium of claim 15, wherein at least one of the one or more restrictions is an expiration date restriction that sets an expiration date beyond which the VM is prevented from being run; and wherein the VM is prevented from being executed when a current date is past the expiration date.

20. The non-transitory computer readable storage medium of claim 15, wherein at least one of the one or more restrictions is a machine restriction that permits the VM to execute only on one or more specified physical computer systems; and wherein the VM is prevented from being executed if the physical computer is not one of the specified physical computer systems.

\* \* \* \* \*